United States Patent
Khim Yeoh et al.

[11] Patent Number: 5,274,770
[45] Date of Patent: Dec. 28, 1993

[54] FLEXIBLE REGISTER-BASED I/O MICROCONTROLLER WITH SINGLE CYCLE INSTRUCTION EXECUTION

[75] Inventors: Charles W. Khim Yeoh; David E. Yue Ong, both of Singapore, Singapore

[73] Assignee: Tritech Microelectronics International Pte Ltd., Singapore, Singapore

[21] Appl. No.: 921,713

[22] Filed: Jul. 29, 1992

[51] Int. Cl.$^5$ .............................................. G06F 15/02
[52] U.S. Cl. ............................................... 395/275
[58] Field of Search ............... 395/275, 550; 364/228.5, 238.3, 238.4, 245.6, 271.1, 926.93, 964.4

[56] References Cited

U.S. PATENT DOCUMENTS

| | | | |
|---|---|---|---|
| 3,833,888 | 9/1974 | Stafford | 395/275 |
| 4,845,657 | 7/1989 | Yokota et al. | 395/275 |
| 5,025,368 | 1/1991 | Watanabe | 395/275 |
| 5,079,692 | 1/1992 | Takeda | 395/275 |
| 5,165,033 | 11/1992 | Kawasaki et al. | 395/275 |
| 5,179,668 | 1/1993 | Ejima et al. | 395/275 |

Primary Examiner—Dale M. Shaw
Assistant Examiner—Moustafa M. Meky
Attorney, Agent, or Firm—George O. Saile; Wm. S. Robertson

[57] ABSTRACT

A new controller transfers data directly between the register of an I/O port and an ALU register in an operation that takes only one phase of a two-phase clock cycle. A transfer between an ALU register and main memory is also performed in one phase, and the entire transfer can be accomplished in one clock cycle. A connection is also provided between the ALU registers and the flag register, and when the incoming byte is a status byte, the controller can transfer the byte to the flag register where it can control the next instruction execution.

5 Claims, 2 Drawing Sheets

FLEXIBLE REGISTER-BASED I/O MICROCONTROLLER WITH SINGLE CYCLE INSTRUCTION EXECUTION

FIELD OF THE INVENTION

This invention relates to data processing apparatus and more specifically to a controller and a method of operation that achieves input/output (I/O) transfers in one clock cycle.

BACKGROUND

A controller is a specialized processor that ordinarily does not have all of the features of a general purpose processor. Typically, a controller and a general purpose processor handle I/O operations differently. An example of an I/O device is a motor that the controller turns on and off according to a program that is executed by either a controller or a general purpose processor.

A controller has ports that can be connected to I/O devices. An I/O port has a register that is used for transferring data bytes between the controller and the I/O device. (The term "byte" will be used to mean a multi-bit unit of data that is transferred on the data busses of the controller, without regard to the specific number of bits for a particular controller.) Both the controller and the device can read and write data of various kinds at the port. Conventional hardware or programming prevents overlapping read and write operations and tells the controller and the device when to read the port register.

In a controller, a byte for an I/O transfer passes through an arithmetic and logic unit (ALU) and the steps of the transfer process are controlled by its instruction decode and control unit. By contrast, a general purpose processor commonly handles I/O operations by issuing I/O instructions to another processor (a data channel) that issues commands to an I/O device and independently handles the data path between the I/O device and main memory.

SUMMARY OF THE INVENTION

It is a general object in this art to make the I/O operations fast. Controllers are commonly formed on a single chip, and it is desirable to provide a simple architecture. It is desirable to avoid adding complexities that commonly are resorted to in the design of a general purpose processor. In embedded applications, such as a telephone chip, it is desirable to minimize the size of the controller. This is because there are other functions that are required within the same chip such as the dialer. A more specific object of this invention is to perform I/O operations in one clock cycle, like other instructions of a reduced instruction set computer (RISC).

This controller achieves these objects by a new and improved register arrangement and by an operation that this arrangement permits.

A register in each I/O port is directly accessible by the controller and by the attached I/O device. In an output operation, data is transferred from any register or memory onto the data bus on a first phase of a clock cycle, optionally operated on by the ALU, and it is transferred to the I/O register on a second phase of the clock cycle.

On an input operation, a byte is transferred from an I/O register onto the data bus on the first phase of a clock cycle and is transferred to main memory or any other registers in the second phase.

The flag register is also connected directly to the data bus. On a status input operation, a status byte is transferred from the I/O register onto the data bus in the first clock phase in the way already described for a data input operation. On the second clock phase the byte on the data bus is transferred to the flag register.

On the second clock cycle, the controller fetches the next instruction from main memory (as is conventional). Conventionally, the execution of the instruction can be modified by bits in the flag register. For example, the next instruction can branch on a condition represented by the flag bits.

Other objects and features of the invention will appear in the detailed description of the preferred embodiment of the invention.

THE DRAWING

THE PREFERRED EMBODIMENT

Figure 1:
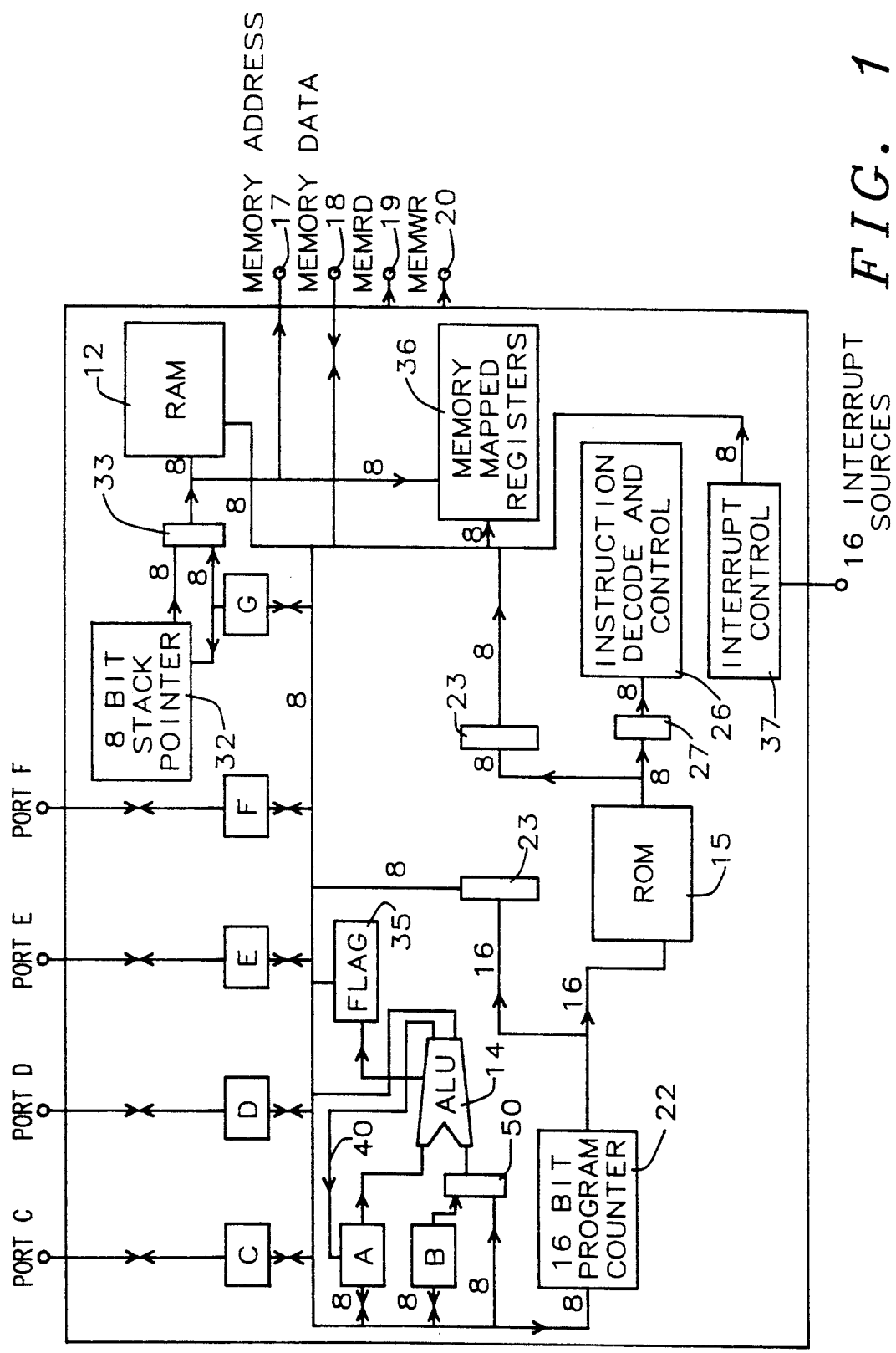
FIG. 1 is a block diagram of the controller of this invention.

Introduction—FIG. 1

The processor memory (RAM) 12, the arithmetic and logic unit (ALU) 14 and the control memory (ROM) 15 are familiar components in most data processing apparatus. These components are interconnected on a bus that is preferably 8 bits wide. A border in the drawing shows the separation from other components. Lines on the right represent an external memory address bus 17 and external memory data bus 18 for external RAM or registers and control lines 19 for external read operations (MEMRD) and 20 for external write (MEMWR) operations.

The control memory 15 holds instructions for executing the program. For instruction fetch, the ROM is accessed at a memory location defined by a 16 bit program counter 22. A buffer 23 connects the 16 bit address bus to the 8 bit bus of the other components. The ROM output is connected to the data bus through a buffer register 23; it is also connected to an Instruction Decode and Control component 26 through an instruction register (IR) 27. Instruction Decode and Control component 26 provides control lines (conventional and not shown) to open and close gates (also conventional and not shown) to control the flow of data. Suitable instructions control the data paths, and an example is given later.

The controller registers

A register is a set of latches that hold a data byte (defined earlier) or multiple data bytes as in the example of the ROM program counter.

Register A is connected to receive data from the output of the ALU through line 40 and to provide data to the ALU. Registers A and B will be called the ALU registers. The ALU registers are also connected for data transfers with main memory and other components. A multiplex circuit 30 connects the B side of the ALU to receive data from the general data bus.

The controller has several registers, C, D, E, and F that each form an I/O port. An I/O device connected to a port can read the associated register and can write a byte into the register. Data paths also connect each of these registers for transfers to and from the ALU registers (A and B). Thus, these registers are connected to an I/O device like conventional I/O registers and are connected to the ALU registers like other components that are connected to the ALU registers. The I/O port registers will be described in further detail in the description of an I/O operation.

Register G is a conventional register used primarily for addressing main memory, and it is associated with an 8 Bit Stack Pointer 32. A multiplex circuit 33 supplies an 8 bit address to RAM and memory-mapped registers 36 from one of these sources. Register G is used with the I/O registers and will be referred to again in the description of the I/O operations.

A flag register 35 is conventionally connected to receive bits that show the status of the ALU operations, for example a bit to show an overflow in the ALU when an add instruction is executed. Other instructions test these bits and for example perform conditional operations such as a branch after an operation to compare the bytes in registers A and B.

Conventional memory mapped registers 36 are connected to the same address bus and data bus as RAM. Note that the memory mapped registers are distinct from the I/O registers C through F, except for their interconnections through the data bus system.

An interrupt control block 37 processes the external interrupts that are used for example to signal that an I/O device has put a byte in its port register.

Figure 2:
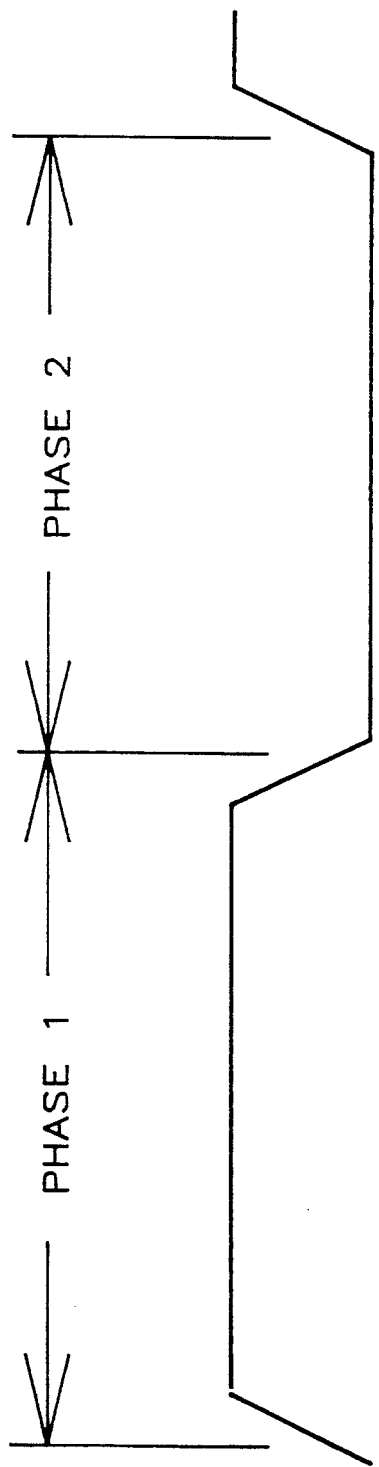
FIG. 2 is a typical instruction cycle that illustrates the I/O operations of this controller.

An I/O operation—FIG. 2

The preferred controller performs general instructions in one clock cycle, as is conventional, and with the register arrangement of this invention the controller also performs an I/O transfer in one clock cycle.

In FIG. 2, a clock cycle is represented by a waveform that is high for the first clock phase and is low for the second clock phase. A data transfer inside the controller is performed in two steps: a transfer from register or memory onto the data bus in a first step and a transfer from the data bus to another register or memory in a second step.

Because the I/O registers are connected directly to the data bus, an I/O transfer can also be performed in the two phases of one clock cycle. An I/O transfer preferably has a preliminary operation to load a memory address into register G when it is to be transferred to RAM 12 or memory mapped registers 36.

In the first phase of executing an instruction for an output operation, data is transferred from the memory location pointed to by register G onto the data bus. In the next phase of this instruction execution (in the same clock cycle), the data on the data bus is transferred to the selected I/O register. (The instruction decode and control block 26 opens the gates in the data path to the selected I/O register.) Thus the controller achieves the advantage of writing a port register from memory in only 1 clock cycle.

Before an input operation begins in the controller, the I/O device loads a byte into the register of the port to which it is connected and signals the controller. In the first phase of a clock cycle for executing an input instruction, data in the selected input register (source) is transferred onto the data bus. In the second phase of the same clock cycle, data on the data bus is transferred to the memory location (destination) pointed to by register G. Thus, an input operation is performed in only 1 clock cycle.

When the I/O device is ready to present a status byte it places the byte in its port register and signals the controller in the way already described for a data byte. In the first phase of a clock cycle the controller transfers the status byte onto the data bus in the way already described for a data input transfer. (The controller distinguishss a data input from a control byte input by conventional hardware or programming.) The controller then transfers the control byte on the data bus to the flag register. Note that this operation takes place in one cycle and is the result of the execution of one instruction; the instruction would have a syntax such as "Push Flag, C" (where C is an example of an I/O register).

As FIG. 2 shows, the next instruction can be fetched from ROM during the second phase of the clock cycle.

While the status byte on the data bus being transferred to the flag register. At the end of the clock cycle for the status input operation, the controller is ready to execute the next instruction in the program, and the status bits in the flag register can control this instruction. For example, the next instruction may branch to a section of the program that responds to the particular status that the device reported.

Typical Operation of FIG. 1

Register Transfer Operation: A byte of data from a source register or memeory is transferred onto the data bus in the first clock phase. The byte of data is then transferred to a destination register on memory on the second clock phase after passing through the ALU.

Example of Register Transfer Operation: Port C is connected to an I/O device (motor). To read the status of the I/O device, a typical instruction would be LD A, C; load port C status byte into register A. To control the I/O device, a typical instruction would be LD C, A; load register A control byte to port C.

ALU Operation: ALU operation would include arithmetic operations such as addition and logical operations such as AND. A byte of data from a source register or memory is transferred onto the data bus in the first clock phase. The byte of data is operated on with the byte of data in the register A. This happens in the ALU. After the operation is computed, the byte of data is always transferred back to register A through line 40.

Example of ALU operation: AND A, C; port C byte is ANDed with register A and the result is transferred back to register A.

Other Embodiments

The preferred embodiment of the invention provides a simple architecture that is suitable for a low cost controller formed on a single chip. The register arrangement provides fast I/O transfers and fast processing of status bytes returned by an I/O device. The I/O registers can be located on a different chip with an increased delay from the additional signal path. Those skilled in the art will recognize other modifications of the preferred embodiment, within the spirit of the invention and the intended scope of the claims.

We claim:

1. A controller of the type having at least one I/O port (reference character C), the port having an I/O register that is accessible to an I/O device such as a motor, an arithmetic and logic unit (ALU) and an instruction decode and control unit having means for executing an instruction in one multi-phase clock cycle having a first phase and a second phase, a main memory, a flag register and means for conditioning the execution of a next instruction according to the contents of the flag register, other registers, including an ALU register (reference character A), each holding a multi-bit byte of data, wherein the improvement comprises, a multi-bit bus with gates connected to be controlled by the instruction decode and control unit for establishing a data path between the ALU register and the I/O register in the execution of a predetermined instruction, means connecting the flag register to be loaded directly from the ALU register, and means in the instruction decode and control unit for controlling the bus for transferring a byte from the I/O register to the ALU register on a first phase of a cycle and from the ALU register to the flag register on the second phase of the same cycle, whereby, after an operation to read a device status byte placed in the I/O register by an I/O device, the next ALU instruction is conditioned on the status byte, a register (G) connected for addressing a location in main memory for transferring a byte between the ALU register and the main memory location, means connecting the ALU register directly to the I/O register for transfers to the ALU register from the I/O register in a first clock phase and for transfer from the ALU register to main memory in a second clock phase of the same clock cycle, and means connecting the ALU register directly to the main memory for transfers to the ALU register from main memory in a first clock phase and for transfer from the ALU register to the I/O register in a second clock phase of the same clock cycle, whereby the controller can perform transfers in either direction between the I/O register and main memory in one multi-phase clock cycle.

2. A method for operating a controller with an I/O device, for example a motor, the controller being of the type that has a main memory and an arithmetic and logic unit (ALU) for executing a sequence of instructions using an ALU register, a flag register and an I/O register that is accessible to the I/O device, comprising the following steps, on an output operation, transferring a byte from a selected main memory location to the ALU register (reference character A), and then transferring the byte in the ALU register directly to the I/O register (reference character C)

and on an input operation, after the I/O device has placed a status byte in the I/O register, the steps of transferring the status byte from the I/O register to the flag register, and conditioning the execution of the next instruction according to predetermined bits in the status byte.

3. The method of claim 2 wherein executing the next instruction comprises executing a branch instruction that is conditional on the bits in the flag register.

4. The method of claim 3, wherein the controller has a register that is connected for addressing the memory and wherein the method includes the preliminary step of transferring a memory address to a register (reference character G) that is connected for addressing the memory.

5. The method of claim 3 wherein the controller operates in a cycle having a first phase and a second phase, including the steps of transferring a byte from memory to the ALU register in a first phase and transferring the byte from the ALU register to the I/O register in the associated second phase, whereby a transfer is performed in a single cycle.

* * * * *